United States Patent [19]

Lee

[11] 4,034,839

[45] July 12, 1977

[54] SIMPLIFIED MULTI-PRICE VEND CONTROL CIRCUIT

[75] Inventor: Larry D. Lee, St. Louis County, Mo.

[73] Assignee: H. R. Electronics Company, High Ridge, Mo.

[21] Appl. No.: 631,721

[22] Filed: Nov. 13, 1975

[51] Int. Cl.² .................... G06F 15/46; G07F 11/00

[52] U.S. Cl. .................................... 194/10; 194/1 N

[58] Field of Search ............... 194/1 N, 10, DIG. 3, 194/9; 133/2; 250/551; 200/DIG. 36

[56] References Cited

U.S. PATENT DOCUMENTS

| | | | |
|---|---|---|---|
| 3,344,898 | 10/1967 | Klinikowski | 194/1 N |
| 3,486,029 | 12/1969 | Barrett et al. | 250/551 |
| 3,841,456 | 10/1974 | Levasseur | 194/1 N |
| 3,894,220 | 7/1975 | Levasse ur | 194/1 N X |

*Primary Examiner*—Stanley H. Tollberg
*Assistant Examiner*—Joseph J. Rolla
*Attorney, Agent, or Firm*—Charles B. Haverstock

[57] ABSTRACT

A vend and price selection control circuit including selection switches actuatable by a customer to produce any of a plurality of possible vends at different vend prices, all of which are controlled by the same control and logic circuitry and circuit elements to enter pricing information, to apply power to a selected vend operator member and to perform other vend and refund functions. The present control circuit includes a pulse generator for making rapid entry of pricing and other information, a comparator to initiate and effect a vend and other functions, and it has the capacity of a wide range of vend price and product selection capability.

19 Claims, 2 Drawing Figures

SIMPLIFIED MULTI-PRICE VEND CONTROL CIRCUIT

There are many multi-price vend control circuits sometimes called changers which control the product delivery and also make change or refunds. Some of the known devices also have some price selectivity and other capabilities such as providing escrow, product selection, refunding and so forth. There are also known control circuits which make comparisons between amounts deposited or otherwise entered and a vend price. Typical of the prior art devices are the devices disclosed in the following listed patents.

U.S. Pat. No. 3,687,255 dated Aug. 29, 1972
U.S. Pat. No. 3,820,642 dated June 28, 1974
U.S. Pat. No. 3,841,456 dated Oct. 15, 1974
U.S. Pat. No. 3,894,220 dated July 8, 1975
U.S. Pat. No. 4,008,792 dated Feb. 22, 1977.

So far as known, there is no vend control circuit which is able to provide almost unlimited price and product selection and at the same time control the product delivery and other control functions using the same circuit or circuit element and which is as simple structurally and operationally as the present circuit. This fact makes it possible to increase or decrease the number of prices and vend possibilities without limit and without affecting the main circuitry of the device. If the present circuit is constructed to be operated by a sixty cycle power source than when a vend selection is made pricing information is transmitted for entry in the logic circuitry at least at a rate as fast as the time required for one cycle of the power source to occur, which in the case of a sixty cycle power source in one sixtieth of a second. Also, the time required for one cycle of the power source is sufficient time for the subject circuit to make a price entry and to make a decision to vend or not to vend. In the present circuit the pricing entry is made by binary price code and is to be distinguished from previous selection methods such as selection methods that use column codes and other codes that must be converted to price codes to be used. The present device therefore offers an inexpensive, yet extremely versatile method of controlling a vending or like machine and provides means for producing a wide range of price and product selectivity, and it does so by means which require relatively little equipment or circuitry.

It is therefore a principal object of the present invention to teach the construction and operation of a relatively simple vend control circuit which makes use of the same basic control circuitry to control all machine functions and yet lends itself to almost unlimited price and product selectivity.

Another object is to provide vend control means which are capable of responding extremely rapidly to price and other entry functions to control the on and off states of a vend control circuit.

Another object is to provide a vend control circuit which has the capability of providing substantially unlimited numbers of possible vend and vend price selections.

Another object is to provide selection switch control means which control the application of strobe power to a price entry circuit which enters pricing information for comparison with information as to an amount of a deposit to control the application of power to a vend producing device to cause a vend to be initiated.

Another object is to substantially increase the utility, flexibility and versatility of vend control circuits.

Another object is to substantially simplify the circuitry required to provide multi-price, multi-vend capability to a vending machine.

Another object is to substantially simplify the circuitry required to provide multi-price, multi-vend capability to a vending machine.

Another object is to substantially reduce the number of parts and the complexity of vend control circuits having multi-price and multi-selection capability while at the same time increasing circuit reliability, making vend control circuits more trouble free and reducing the cost of manufacture.

Another object is to simplify the time and equipment required to establish a vend price in a vending machine.

These and other objects and advantages of the present control means will become apparent after considering the following detailed specifications which discloses a preferred embodiment of the present control circuit in conjunction with the accompanying drawings.

Figures 1, 2:
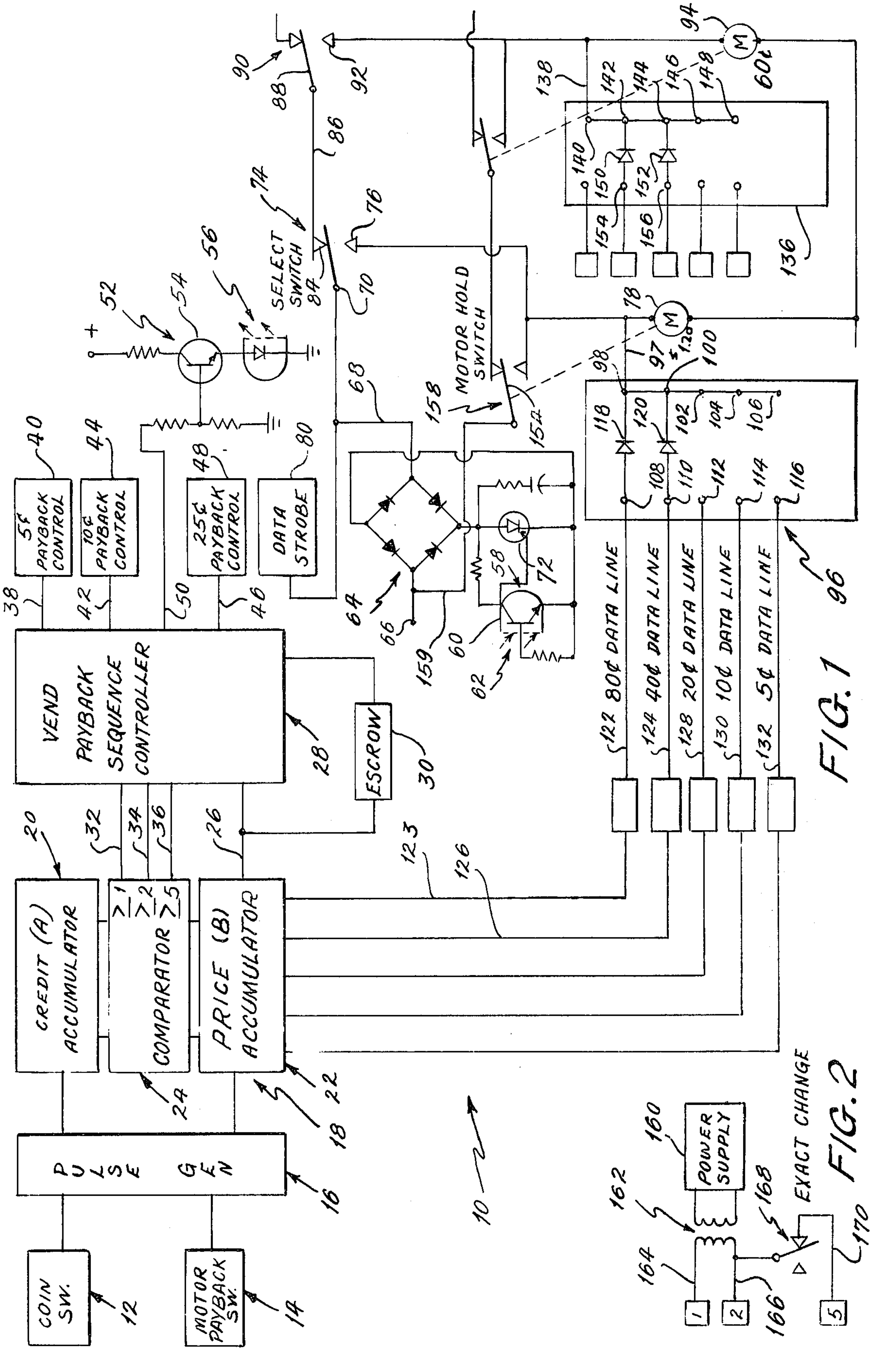
FIG. 1 is a block diagram of the vending control circuit of the instant invention.
FIG. 2 is a block diagram of a power supply circuit for the vending control circuit.

Referring to FIG. 1 more particularly by reference numbers, number 10 refers to a control circuit for a vending machine constructed according to the teachings of the present invention. The circuit 10 has many features which may be similar to features of existing vending control circuits including having a coin unit with coin switches or some other types of credit entry unit 12, a payback switch circuit 14, a pulse generator circuit 16, and a comparator circuit 18. The comparator circuit 18 includes a first or A accumulator portion 20 in which are accumulated amounts representing deposits made during each vending operation, and a second or B accumulator portion 22 which is the pricing portion in which is entered the vend price of a selected item or service. The accumulator 22 also has entered in it amounts equal to the value of each coin refunded during a payback operation as will be described.

The comparator circuit 18 also has a comparator portion 24 which makes comparisons between credit amounts entered in the A accumulator 20 and the vend prices entered in the B accumulator 22, with and without amounts entered in the B accumulator due to a payback or refunding operation. The comparator circuit 18 produces outputs depending on the difference between the amounts entered in the accumulator portions 20 and 22. The circuit 18 is shown having a first output 26 which is connected to several places including to a vend payback sequence control circuit 28, an escrow control circuit 30 and is also used to control vending. The comparator circuit 18 also has other outputs including output 32 labeled greater than or equal to one. When an output signal is on the output 32 it means that there is at least one of the smallest acceptable coin unit difference between the amounts entered in the accumulator portions 20 and 22. Another output 34 labeled greater than or equal to two has a signal on it when there is at least two units difference between the amounts entered in the A and B accumulators 20 and 22, and a third output 36 labeled greater than or equal to five has a signal on it where there is at least five units difference between the amounts entered in the accumulators 20 and 22. The outputs 32, 34 and 36 are connected as inputs to the vend payback sequence controller circuit 28 and are used to control the payback or refunding of amounts that are deposited in excess of the price of the vend selected by the customer. In a typical nickel, dime, quarter control circuit, the control outputs on leads 32, 34 and 36 are used to control the paying back or refunding respectively of nickels, dimes and quarters. For example, if there is a greater than or equal to five units difference between the amount entered into the accomulator portions 20 and 22, the vend payback sequence controller 28 will be programmed to payback a quarter. If the difference is less than five but equal to or greater than two units, the circuit 28 will be programmed to payback dimes, and if the difference is less than two but greater than zero, circuit 28 will be programmed to payback nickels. The payback operations will take place in sequence with priority being given to the paying back of the highest possible denomination coins first so as to make paybacks in the least possible number of coins. Circuits having these basic characteristics are disclosed in the above identified cases.

Each payback operation will not only return a coin but will also increase the amount entered in the B accumulator 22, and this will continue until the amount entered in the B accumulator 22 is equal to the amount in the A acculumator 20 whereupon the payback operation is completed and the accumulators are reset. This process occurs because each time a coin is paid back the payback motor switch 14 will be actuated to cause the pulse generator 16 to feed an appropriate number of impulses to the B accumulator 22 corresponding to the value of the coin paid back. The circuitry required to produce pay backs as described may be of well known construction such as disclosed in U.S. Letters Pat. Nos. 3,687,255; 3,820,642; 3,894,220, 3,841,456 and 4,008,792 all of which are assigned to Applicant's assignee. In the circuit as shown the nickel pay backs are controlled by outputs of the circuit 28 on lead 38 and control the nickel payback control means 40, dime payback signals appear on lead 42 and control the dime payback control circuit 44, and quarter payback control signals appear on lead 46, and control the quarter payback control circuit 48.

The vend payback sequence control circuit 28 has another output 50 which is connected to vend control circuit 52. When an output appears on this lead it provides a condition which enables a vend operation to be initiated. The vend control circuit 52 has a normally non-conducting transistor 54 connected in series with the light emitting portion 56 of a light emitting diode 58. The other or controlled portion 60 of the LED is in a power supply control circuit 62 which includes a full wave rectifier 64 connected to A.C. line lead 66. The opposite corner of the full wave rectifier 64 is connected by lead 68 to movable selection switch contact 70. The other opposed corners of the full wave rectifier 64 are connected across power supply control circuit 62 which includes the controlled portion 60 of the light emitting diode in circuit with an electronic switch device shown as being SCR 72. The circuit 62 also includes unnumbered resistors and a capacitor connected as shown. When an output signal appears on the lead 50 it causes the transistor 54 to go to a conducting condition and in so doing also causes conduction through the light producing portion 56 of the LED 58. This in turn causes conduction of the LED portion 60 which turns on the SCR 72 to establish full power circuit continuity from the input power lead 66 to the movable contact 70 of the selection switch 74 (or any other selection switch that happens to be activated). Since the actuated selection switch is at this time making contact with its normally open contact such as with contact 76, a circuit is established from the power source to energize vend motor 78.

Simultaneously with the actuation of the selection switch 74 and even slightly prior to energizing of the vend motor 78, a circuit is established from a data strobe source 80 to a price matrix device to be described later. The signals from the data strobe circuit 80 are relatively weak signals which are suitable to enter the vend price in the price accumulator 22 to perform various circuit functions including initiating vend and payback operations but are not strong enough by themselves to energize the vend motor 78. The energizing of the vend motor must therefore await the occurrence of a signal on lead 50 which occurs almost simultaneously but slightly after the signal from the data strobe circuit 80 enters the price.

The normally closed side of the selection switch 74 is connected in series with the normally closed sides by any desired number of other similar selection switches depending on the number of possible vends and/or vend prices that are desired. This feature is important to the present circuit for reasons which will become apparent. The data strobe circuit 80 as indicated produces a continuous supply of output pulses at a given frequency such as the line of frequency of sixty cycles, and this means that information such as vend price information can be entered into the price accumulator 22 every sixtieth of a second. The selection switch 74 has its normally closed contact 84 connected by lead 86 to the movable contact 88 of a similar selection switch 90 and so on down the line. Each of the selection switches 74, 90 and so on as required, also has a normally open contact such as the contacts 76 and 92, and these contacts are connected to several different places in the circuit including to respective vend motors such as motors 78 and 94. Any number of such switches and motors can be provided as required.

When the selection switch 74 is actuated by a customer, its movable contact 70 moves out of engagement with the normally closed stationary contact 84 and into engagement with the normally open stationary contact 76. This immediately causes a circuit to be established to the vend motor 78 and it also establishes a circuit on lead 97 which is connected to the input side of pricing matrix circuit device 96. The pricing matrix 96 in the construction shown has five input and five output terminals, any corresponding ones of which can be used to establish a vend price, as will be explained. The input terminals of the device 96 are terminals 98, 100, 102, 104 and 106 and the output terminals are terminals 108, 110, 112, 114 and 116. In the pricing matrix card 96 the input terminal 98 is connected to the corresponding output terminal 108 through a diode 118, and the input terminal 100 is connected to the output terminal 110 through another diode 120. None of the other input terminals is connected and therefore they are not used in the matrix card 96.

Whenever an output signal such as a signal from the data strobe 80 is present on the output terminal 108 and on lead 122 which is connected thereto, a signal which represents a vend price of eighty cents is applied to the corresponding input lead 123 of the price acumulator 22. This can be easily represented for entry in binary form. In like manner, whenever an output signal is present on the output terminal 110 of the matrix card 96 and on lead 124 connected thereto it represents and is used to enter a vend price of forty cents, also a binary form for entry on lead 126 in the price accumulator 22. If signals are present simultaneously on the leads 122 and 124, the combined output from the matrix 96 will represent a total vend price entry of $1.20 which is the sum of the individual entries. In like manner, if an output signal were to appear on the output terminal 112 of the matrix card 96 and on lead 128 it represents a vend price amount of twenty cents, a signal on output terminal 114 and lead 130 represents a ten cent price entry amount, and an output on terminal 116 and on lead 132 represents a vend price entry amount of five cents. Any combination represented by signals appearing on the output terminals 108-116 can be obtained for entry in the price accumulator 22. This is done by connecting diodes such as diodes 118 and 120 between other corresponding pairs of terminals in the pricing matrix device 96. Thus with the circuit connected as shown in the drawing, actuation by the customer of the selector switch 74 immediately operates to apply a signal to the input lead 97 of the matrix circuit 96 for entry of the appropriate vend price in the B accumulator 22. The signal from the data strobe 80 is sufficiently strong to make the price entry. The same signal is also applied to the vend motor 78 but is not strong enough to energize the vend motor and this must wait until later when the output of the vend control circuit 52 indicates that there has been sufficient deposit to equal the selected vend price at which time power will be supplied to the vend motor 78 from the main power source. This will be described later.

The second selection switch 90 can be operated in the same manner as the selection switch 74, and when this is done a signal is fed from the data strobe circuit 80 to a second price matrix 136 on lead 138. This signal appears on matrix input terminals 140, 142, 144, 146 and 148 which correspond respectively to the input terminals 98–106 of the matrix 96. However, in the case of the matrix 136 diodes 150 and 152 are connected respectively between the input terminals 142 and 144 which are the positions that correspond to the forty cents and twenty cents positions, respectively, and to output terminals 154 and 156. The output terminals of the matrix device 136 are connected to the corresponding respective output leads 122–132 of the matrix card 96 and also the corresponding input to the vend price accumulator 22. This means that when the switch 90 is actuated a forty cent and twenty cent output will be entered into the pricing accumulator 22 to establish a vend price of sixty cents rather than a vend price of a 1.20 as in the case of the selection switch 74. Any number of similar selection switches, vend motors and price matrix circuit devices can be connected into the subject circuit and each such circuit can be set to establish the same or a different vend price depending on the number of locations where the diodes are connected. With the circuit as shown it is possible to establish any vend price from a low of five cents to a high of 1.55. An even greater price range can be established by adding additional input and output terminals to the matrix circuits although this may also require additional circuits in the input to the price accumulator 22.

After a price has been entered in the B accumulator 22 and a deposit at least equal to the price is entered in the A accumulator 20, the comparator circuit 18 will produce the required outputs. One of these outputs is on the lead 50 and is fed to the vend control circuit 52 which operates to apply input energy sufficient to energize the selected vend motor such as the vend motor 78. The application of full motor power is supplied through the same select switch such as the switch 74 to the motor and is available almost simultaneously with the actuation of the select switch assuming the deposit is sufficient. The only delay will be in the time it takes for the circuitry to determine that the deposit at least equals the vend price. As soon as the vend motor 78 is energized and commences to operate it will mechanically transfer a motor hold or carry switch contact such as the contact 158. The movable contact of the hold switch 158 is connected directly to one side of the main energy source so that when it closes it establishes a circuit which holds the motor 78 energized until a vend cycle is completed. This is under control of cam or like means (not shown) which eventually release the motor hold switch 158 so that it can return to its inoperative condition. The hold circuit is needed to assure that a complete vend cycles takes place, and prevents the possibility that a customer might be able to actuate a select switch for too short a time for a vend cycle to take place. A similar motor hold switch is provided for each of the vend motors, and these switches are shown connected in series circuit and to one side of the input power supply at the terminal 66 by lead 159.

The power supply circuit 160 for the subject device is shown in FIG. 2 and is connected through a transformer 162 to an input energy source such as to a 115 volt A.C. source by leads 164 and 166. The lead 166 is also connected to normally closed switch 168 labeled Exact Change. When this switch is actuated the vending machine cannot make change so the customer should only deposit the exact amount for the vend he desires. The opposite side of the switch 168 is connected by lead 170 and is used only when it is desired or required that the machine operates only when the exact change is deposited. This can occur when there is insufficient coinage in the coin refund or change making tubes to make change and when the machine cannot make change a light or other means may be energized to inform the customer.

Various means can be used to couple the outputs of the matrix circuits to the input to the price or B accumulator 22. One such means is to use light emitting diodes such as that used in the vend control circuits 52 and 62 described above. Light emitting diodes have the advantage of providing isolation between the inputs. This is advantageous especially when a plurality of matrix circuits are used and programmed to enter different prices into the same price accumulator. The blocks shown in the leads 122–132 are intended to indicate the use of LEDs or like devices for this purpose.

Other means of a known construction such as disclosed in the prior art noted above can be used to reset the A and B accumulators 20 and 22. Similar reset circuit means can also be used to reset other circuit portions as needed. The reset and refund means employed in the present circuit are not at the heart of the present invention and are included to make the disclosure more complete.

Thus it can be seen that when a customer makes a deposit in a vending machine equipped with the present control circuit and depresses one of the selection switches a price will immediately be entered in the B accumulator 22 for comparison with the amount deposited which is entered in the A accumulator 20. If the amount entered in the A accumulator 20 equals or exceeds the vend price entered in the B accumulator 22, the circuit 28 will receive an input from the comparator 24 and produce a vend output on lead 50. This output will cause power to be applied almost instantaneously to the corresponding vend motor. As soon as the motor is energized it will close its vend hold switch as described to assure completion of the vend cycle even if the customer takes his finger off the vend switch as soon as possible.

Many of the components of the present control circuit may be of known construction as stated, and some of the circuit components can be similar to corresponding components in other cases including those identified above. This includes the coin and refund circuits 12 and 14, the pulse generator 16, the comparator circuit 18, including the accumulator portions 20 and 22 thereof, the sequencing circuit 28 and the escrow circuit 30. The data strobe circuit 80 which is a pulse producing circuit, however, is believed new as employed in the present circuit as are the selection means including the selection switches, the use of matrix circuit devices and the way they are connected to enter different vend prices, and the manner in which the vend motors are energized and held energized. Of special importance to the present construction is the fact that the present circuit can be made to accommodate any desired number of possible vend prices and vend selections and regardless of the number the same basic control circuitry can be used for all of them. This represents a considerable advancement in the vend control art and one which greatly expands the vending possibilities without unduly complicating the basic control circuitry.

Thus there has been shown and described novel multi-price, multi-vend control circuit means which fulfill all of the objects and advantages sought therefor. It will be apparent to those skilled in the art, however, that many changes, variations, modifications and other uses and applications of the present circuit means are possible and are contemplated. All such changes, variations, modifications and other uses and applications which do not depart from the intent and scope of the invention are deemed to be covered by the invention which is limited only by the claims which follow.

What is claimed is:

1. In a vend control circuit having credit entry means for entering therein amounts that represent amounts deposited, a first accumulator including means to enter therein credit amounts from the credit entry means, price accumulator including input connection means thereto at which signals are produced to enter therein the price of a selected vend, means for comparing a credit amount entered into the first accumulator with a price entered in the price accumulator, said comparator means having output means at which signals are produced to initiate a vend operation whenever the amount entered in the first accumulator at least equals the price entered in the price accumulator, the improvement comprising a plurality of series connected vend select switches individually actuatable by a customer, a price matrix device and an associated vend motor associated with each of said select switches, each of said matrix devices having a plurality of input and output connections arranged in pairs, means connecting at least one of the input connections of each of the matrix devices to the corresponding output connection of said pair to enable electric signals to pass therebetween, means operatively connecting respective ones of the output connections of each of said matrix devices to corresponding inputs of the price accumulator for enabling entry therein in binary form of information representing a selected vend price, the price entered by each of said matrix devices when the associated selection switch is actuated depending on which input and output connection of the matrix devices have connections that enable electric signals to pass, a source of input pulses for connection to the selection switches whereby actuation of a selected one of the selection switches will enable pulses from said source to be applied to and through the respective pricing matrix device to the inputs of the price accumulator, said source of input pulses being insufficient to effectively energize the respective vend motor associated with the actuated selection switch to cause a vend to take place, and means responsive to a signal produced in the output means of the comparator means to establish a circuit to energize the associated vend motor when the amount entered in the first accumulator at least equals the vend price entered in the price accumulator, each of said vend motors including means associated therewith to establish a hold circuit to maintain the vend motor energized to complete a vend cycle, said last named means including means to deenergize the vend motor at the conclusion of a vend cycle.

2. In the vend control circuit defined in claim 1 the further improvement of refund means operatively connected to the comparator circuit, said refund means including means to return amounts deposited in excess of the selected vend price, said last named means including means to enter into the price accumulator an amount equal to the value of each refund, and means to reset the first and the price accumulator when the same amount is accumulated in both.

3. In the control circuit defined in claim 1 the further improvement of a pulse generator connected in circuit between the credit entry means and the first accumulator, said pulse generator including means to excite the first accumulator by a number of pulses corresponding to each credit amount entered in the credit entry means.

4. In the vending control circuit defined in claim 1 each pair of input and output terminals on each of the matrix devices represents a different binary price quantity, the means connecting at least one of said input connections to the corresponding output including a diode, the sum of the binary amounts represented by the diode connections in each matric device establishing the vend price that will be entered in the price accumulator when the corresponding vend select switch is actuated.

5. In the vend control circuit defined in claim 1 said means to deenergize the vend motor includes means to initiate refunds of amounts deposited in excess of a selected vend price.

6. A vend control circuit for controlling the functions of a vending machine including the vending, pricing, refunding, deposit entry and product selection functions comprising a coin unit for receiving deposits of coins of at least two different denominations, first accumulator means having an input operatively connected to the coin unit for having accumulated therein the sum of coins deposited during each vend operation, second accumulator means having a plurality of input connections representing different respective binary amounts, means operatively connected to the input of the second accumulator for entering therein a vend price, said last named means including at least two different customer actuatable vend selection switches independently actuatable by a customer depending on a desired vend, means connecting said switches in series circuit, a source of timed pulses operatively connected to said series connected vend selection switches, respective price establishing means and vend motor means operatively connected to each of said vend selection switches, each of said respective price establishing means including circuit means having a plurality of inputs connected electrically to the respective vend selection switches and through the respective switch when activated by a customer to the source of timed pulses, each of said price establishing means also having a plurality of outputs operatively connected to respective ones of the plurality of input connections to the second accumulator, means connecting selected ones of said plurality of inputs of the respective price establishing means to corresponding ones of the outputs thereof depending on the vend price to be established thereby for entry into the second accumulator, means for comparing the vend price entered in the second accumulator with the amount entered in the first accumulator that represents amounts deposited, said comparing means including means to establish a circuit to energize the respective vend motor whenever the amount entered in the first accumulator at least equals the vend price entered in the second accumulator, said last named circuit establishing means including the respective vend selection switch.

7. The vend control circuit of claim 6 including means responsive to energizing of a selected vend motor to establish a hold circuit to maintain the motor energized to complete the selected vend operation.

8. The vend control ciruit of claim 6 including vend payback sequencer means operatively connected to the output of the comparing means, said sequencer means having output terminals at which payback signals are produced depending on the difference between the amounts entered in the first and second accumulators, means operatively connected to the respective output terminals to control paying back of coins of denominations corresponding in value to said output terminal which has a signal thereon, circuit means associated with each of said payback control means including means to increase the amount accumulated in the second accumulator by an amount representing the value of each coin paid back, and means to reset the first and second accumulator means after a vend operation when the amount entered in the second accumulator which represents the selected vend price plus the amounts refunded equals the amount entered in the first accumulator which represents the amount deposited.

9. The vend control circuit of claim 6 wherein the comparing circuit for establishing a circuit to energize a selected one of the vend motor means includes a source of potential sufficient to energize a vend motor, means operatively connecting said source to the circuit of the series connected selection switches, and means to enable power to be supplied from said source of potential to the selected vend motor, said last named means including means responsive to the output of the comparing means.

10. The vend control circuit of claim 9 wherein the means to enable power to be supplied from said source to the selected vend motor includes a photocoupling means having a light emitting portion operatively connected in the output circuit of the comparing means and a portion responsive to light emitted by the light emitting portion for establishing a power supply connection between the source of potential and the selected vend motor means.

11. The vend control circuit of claim 6 wherein each of the price establishing means includes a circuit element in which the plurality of inputs and outputs are arranged in pairs, each pair representing a binary form a different price amount, the plurality of input connections to the second accumulator corresponding to and having an operative connection to each of said pairs of inputs and outputs.

12. The vend control circuit of claim 11 including a photo coupling means associated with each of said pairs of inputs and outputs, each coupling means having a light emitting portion operatively connected to the output position of one of said pairs and a portion responsive to light emitted by the respective light emitting portion operatively connected to the corresponding input connection to the second accumulator.

13. A vend control circuit comprising a coin unit for accepting coins of at least two different denominations, accumulator means operatively connected to the coin unit including means for entering into the accumulator means amounts representing the value of each different denomination coin deposited during a vend operation, a price accumulator means having a plurality of input connections for the entry therein of a selected vend price, said last named means including a plurality of serially connected vend selection switches any one of which can be actuated by a customer depending on the vend he chooses, a vend price establishing device associated respectively with each of the vend selection switches, each of said vend price establishing devices having a corresponding number of input and output connections, means operatively connecting the output connections respectively to the input connections of the price accumulator, means establishing continuity between selected ones of the input and output connections of the price establishing means depending on the price to be established thereby for entry into the price accumulator, a source of pulses connected in circuit with the series connected selection switches, operation of a selected one of said selection switches establishing a circuit connection between the pulse source and selected inputs to the price accumulator through the associated vend price establishing device, and means for producing a vend signal to initiate a vend operation whenever the amount entered in the accumulator means at least equals the amount entered in the price accumulator.

14. The vend control circuit defined in claim 13 including a light emitting device operatively connected in circuit between each corresponding output of each of the vend price establishing devices and the corresponding inputs to the price accumulator.

15. The vend control circuit defined in claim 13 including means associated with each vend motor to establish a hold circuit connection to the vend motor potential source after the selected motor is energized to maintain the selected vend motor energized for sufficient time to complete a vend operation.

16. The vend control circuit defined in claim 13 wherein said means for producing a vend signal include means to produce other outputs depending on the amount of difference between the amount entered in the accumulator means and in the price accumulator, said last named means including means to produce a refund operation when the amount in the accumulator means exceeds the amount entered in the price accumulator.

17. The vend control circuit defined in claim 13 including a vend motor associated with each of the vend selection switches, and means including the associated vend selection switch for energizing the respective vend motor to produce a vend operation when a vend signal is produced, said last named means including a source of vend motor potential and means including the operated vend selection switch and the vend signal to establish a circuit connection between the vend motor potential source and the selected vend motor.

18. The vend control circuit defined in claim 17 wherein the means for energizing the respective vend motor includes a light emitting control element having a first portion responsive to the production of a vend signal and a second portion responsive to the first portion and operatively connected into the source of vend motor potential.

19. A vend and price selection control circuit including means actuatable by a customer to produce any of a plurality of possible vends at different selectable vend prices, a single logic circuit operatively connected to the means actuatable by the customer, said logic circuit including circuit means for controlling the circuit operation regardless of the vend selected by the customer, vend producing means and refund producing means operatively connected to the logic circuit, and means including a pricing matrix associated with each different selectable vend for establishing a vend price, said pricing matrix devices having an operable connection to the means actuatable by the customer and including a source of pulses and means for selectively applying pulses from said source to means for establishing a selectable vend price.

* * * * *